United States Patent [19]
Tasdighi et al.

[11] Patent Number: 6,122,284
[45] Date of Patent: Sep. 19, 2000

[54] MULTIDROP ANALOG SIGNAL BUS

[75] Inventors: Ali Tasdighi, San Jose, Calif.; Joseph J. Judkins, III, Cedar Park, Tex.; Chuong Nguyen, San Jose, Calif.; Donald E. Alfano, Round Rock, Tex.

[73] Assignee: Telcom Semiconductor, Inc., Mountain View, Calif.

[21] Appl. No.: 08/889,109

[22] Filed: Jul. 7, 1997

[51] Int. Cl.$^7$ .................................................. H04Q 11/00
[52] U.S. Cl. ...................... 370/438; 370/532; 340/825.52
[58] Field of Search .................................. 370/449, 464, 370/498, 532, 438, 439, 440; 340/825.52, 825.07; 327/407

[56] References Cited

U.S. PATENT DOCUMENTS

| | | | |
|---|---|---|---|
| 3,943,488 | 3/1976 | Kazahaya | 370/299 |
| 4,196,358 | 4/1980 | Conover et al. | 370/360 |
| 4,293,947 | 10/1981 | Brittain | 370/449 |
| 4,426,697 | 1/1984 | Petersen et al. | 370/438 |
| 4,580,261 | 4/1986 | Pelotte | 370/438 |
| 4,679,192 | 7/1987 | Vanbrabant | 370/438 |
| 4,689,683 | 8/1987 | Efron | 370/438 |
| 4,726,017 | 2/1988 | Krum et al. | 370/449 |
| 4,796,022 | 1/1989 | Schenkel et al. | 370/438 |
| 4,796,025 | 1/1989 | Farley et al. | 370/432 |
| 4,829,297 | 5/1989 | Ilg et al. | 370/449 |
| 4,866,702 | 9/1989 | Shimizu et al. | 370/438 |
| 4,937,811 | 6/1990 | Harris | 370/222 |
| 5,007,042 | 4/1991 | Santi | 370/213 |
| 5,224,097 | 6/1993 | Kaneshima | 370/449 |
| 5,416,910 | 5/1995 | Moyer et al. | 370/438 |
| 5,524,107 | 6/1996 | Duggan et al. | 370/449 |

*Primary Examiner*—Min Jung
*Attorney, Agent, or Firm*—Skjerven, Morrill, MacPherson, Franklin & Friel LLP; Brian D. Ogonowsky; Daniel P. Stewart

[57] ABSTRACT

In the preferred embodiment, the outputs of a plurality of analog signal generators are connected to a single wire (the analog bus). Each analog signal generator is addressable by a unique code provided to its respective address input terminals. A host controller selectively addresses only one of the analog signal generators such that an output of only one of the analog signal generators is applied to the analog bus at a time. In this manner, a single wire may be used to transmit a plurality of analog signals to a receiver. In one embodiment, the receiver is a MUX having an output connected to an ADC.

3 Claims, 1 Drawing Sheet

MULTIDROP ANALOG SIGNAL BUS

FIELD OF THE INVENTION

This invention relates to a system for receiving data from several analog signal generators, such as temperature sensors or other transducers.

BACKGROUND

Many systems utilize components or transducers that provide information in the form of an analog signal. One example is an analog output temperature sensor, which generates a linear output voltage directly proportional to measured temperature. An output signal in analog form is often desirable because only one wire (and ground) is required to transmit information to other devices in the system. The circuit complexity in analog output devices is also lower than equivalent functions fitted with digital output encoding, thereby lowering device cost. In most cases, however, analog signals are required to be converted to a digital format to be assimilated by system computing hardware. This is accomplished with an analog-to-digital converter (ADC). In cases where several analog signals must be converted, a single ADC with an inexpensive input multiplexer (MUX) is used (instead of separate ADCs for each signal). The MUX is a "many-to-1" selector switch that connects only one of the input signals to the ADC at a time. This allows all input signals to be sequentially converted with a single ADC, saving cost and simplifying system hardware.

In certain applications, the number of analog signals requiring conversion exceeds the input capacity of the MUX. One example is a notebook PC where temperature in four different locations must be measured, plus main and back-up battery voltages. This problem can be remedied in four ways: 1) obtain a MUX having a larger input capacity; 2) add a second MUX; 3) modify the system architecture to replace the analog output devices with digital ones; or 4) add another ADC. Each of these approaches has inherent disadvantages. Higher input capacity MUXs have a greater number of pins and, therefore, a larger package size and greater cost. In many system applications, both the MUX and ADC are contained on board a microcontroller. Many microcontrollers have a MUX with a maximum of four inputs, and versions with a larger MUX may not exist. Adding a second MUX adds cost and adversely impacts board space. Replacing the analog output devices with digital output types adds significant cost. For example, a temperature sensor with a two wire, serial output can cost as much as three times that of the same temperature sensor with an analog output. Adding a second ADC adds significant cost and complicates the system address decoding circuitry in that unique address space must be created for the second ADC. In addition, all four of these approaches require a separate circuit board trace from the analog signal source to the MUX input. This complicates circuit board layout and potentially adds electrical noise to the analog signals.

What is needed is a more simple and inexpensive technique for transmitting data from a plurality of analog signal generators to a receiving circuit.

SUMMARY

The invention described here provides a means to connect several analog signal generating devices to a single wire. This technique allows any MUX connected to the analog signal generators to be reduced in size or eliminated. This saves device package size and cost, and simplifies circuit board and system architecture. In the preferred embodiment, the output of each of the analog signal generators is connected to a single wire (the analog bus). Each analog signal generator is addressable by a unique code provided to its respective address input terminals. A host controller selectively addresses only one of the analog signal generators such that an output of only one of the analog signal generators is applied to the analog bus at a time. In this manner, a single wire may be connected to the outputs of a plurality of analog signal generators to transmit an analog signal to a receiver.

In one embodiment, the receiver is a MUX having an output connected to an ADC.

DETAILED DESCRIPTION OF THE PREFERRED EMBODIMENT

Figure 1:
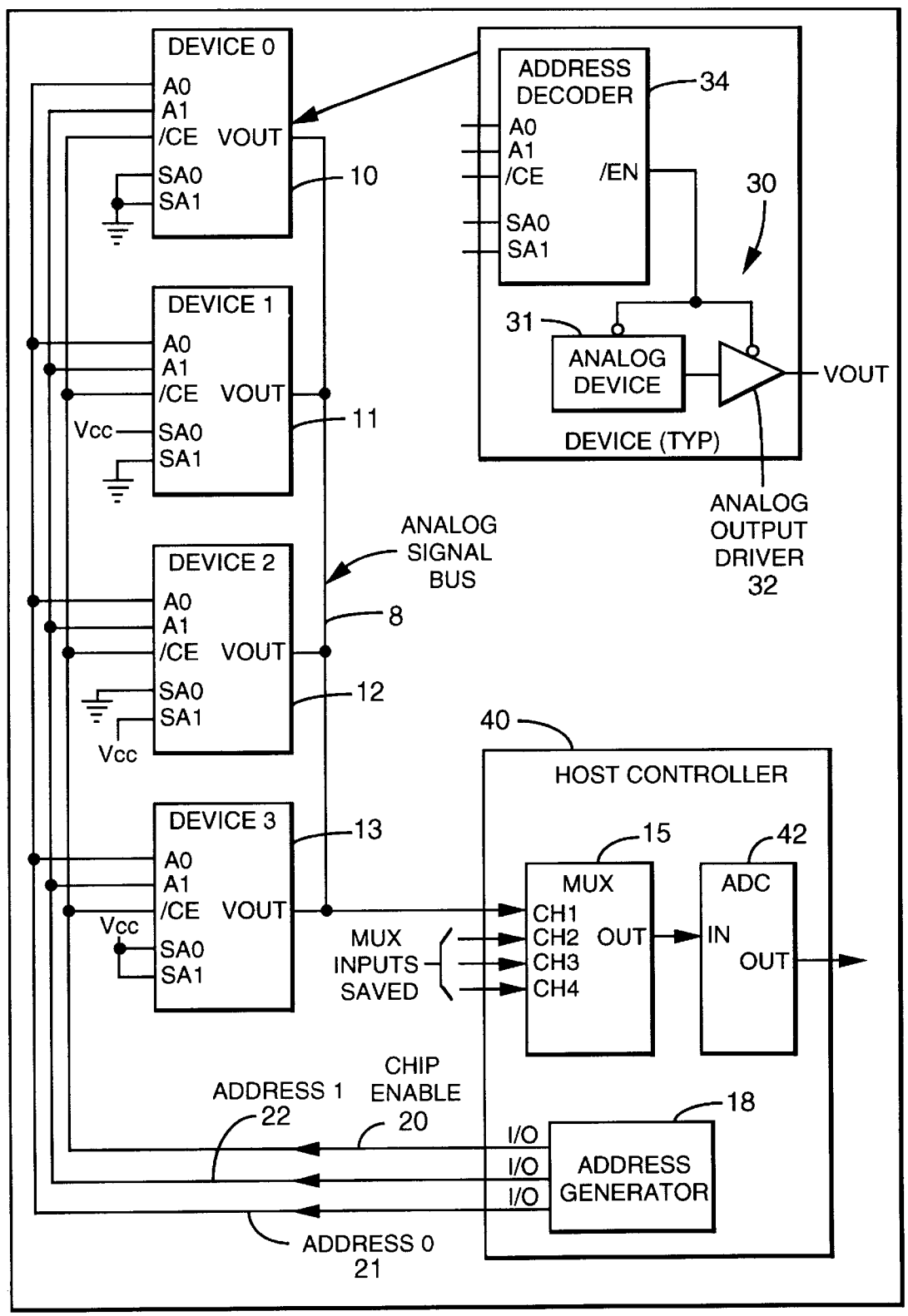
FIG. 1 is a block diagram illustrating one embodiment of the invention.

In FIG. 1, an Analog Signal Bus (8) consists of a single wire, to which the outputs of several Devices 10, 11, 12, 13 connect. Analog signal information is passed, via bus 8, to an input of a MUX 15.

An Address Generator 18 generates a chip enable (CE) signal on wire 20, connected to the CE terminals on Devices 10–13, to enable or disable all the Devices. The Address Generator 18 also generates a 2-bit address code on Address Wires 21 and 22, which are connected to address terminals A0 and A1 on Devices 10–13. When the CE signal is low, a particular address code selects one of the Devices 10, 11, 12, 13. The analog output of each Device 10, 11, 12, 13 is selected only when addressed by the Address Generator 18, otherwise the Device output is in a high impedance state.

If more than four devices are connected to bus 8, then a three or more bit address code would be generated on three or more address lines to address one of the devices.

Each Device 10–13 consists of an Analog Signal Generator 30, consisting of an analog sensor, transducer, or other analog device 31, and an Analog Output Driver 32. The Analog Device 31 may be any analog signal generator. The Analog Device 31 output connects to the Analog Output Driver 32 input. The output of the Analog Output Driver 32 follows the output of the Analog Device 31 when enabled by the appropriate logic level (in this case, a logic low) from the Address Decoder 34 (Select Mode). The Address Decoder 34 receives the CE, A0, and A1 signals on wires 20–22 to determine if the codes signify that the particular Device 10–13 is to be selected.

The output of the Analog Output Driver 32 reverts to a high impedance state when the output of Address Decoder 34 is a logic HIGH (Deselect Mode). The power supply current in Deselect Mode is greatly reduced compared to the power supply current in the Select Mode due to the disabling of the Analog Signal Generator 30. In certain cases, the enable signal from Decoder 34 need not disable the Analog Device 31 as long as the output to bus 8 becomes a high impedance state when the Device 10–13 is disabled.

The output of Address Decoder 34 is LOW when the states of the A0 input and A1 input match the states of the Select 0 (SA0) and Select 1 (SA1) inputs, respectively, and the Chip Enable input (/CE) is a logic LOW. If any of these conditions are not met, the Device 10, 11, 12, 13 is deselected. Any type of Address Decoder may also be used instead of that shown in FIG. 1.

Any number of Devices can be connected to the Analog Signal Bus 8, the limiting factors being the parasitic effects of capacitance and inductance on the Analog Signal Bus 8 and the number of address lines available in the system. MUX 15 may receive other inputs from other buses similar to Bus 8.

A Host Controller 40, incorporating the MUX 15, the Address Generator 18, and an ADC 42, selects one unique Device 10, 11, 12, or 13 to place its output signal on the Analog Signal Bus 8 using Address Wires 21 and 22. The signal from the selected Device is then converted by the ADC 42 aboard Host Controller 40.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A system comprising:

an analog to digital converter having an input terminal and an output terminal, the analog to digital converter being operable to receive an analog input signal at the input terminal, and operable to generate a digital output signal at the output terminal in response to the analog input signal;

an analog multiplexer having a first number of input terminals and an output terminal connected to the input terminal of the analog to digital converter;

a second number of analog devices, the second number being greater than the first number, the second number of analog devices comprising a first set having a plurality of the analog devices and a second set having at least one of the analog devices, the first set of analog devices each having an address input terminal, each analog device being operable to provide an analog output signal at an output terminal;

an analog signal bus connected to the output terminals of the first set of analog devices, the analog signal bus being connected to a first one of the input terminals of the analog multiplexer and configured to conduct an analog signal from the first set of analog devices to the analog multiplexer, the output terminal of an analog device of the second set being connected to a second one of the input terminals of the analog multiplexer, the analog multiplexer being operable to provide a selected one of the signals received at the input terminals of the analog multiplexer to the input terminal of the analog to digital converter;

an address generator operable to generate an address signal at an output terminal, the address signal selecting one of the first set of analog devices; and an address line separate from the analog signal bus, the address line being connected to the output terminal of the address generator and to the address input terminals of the first set of analog devices.

2. An analog signal processing system comprising:

a host controller having an analog to digital converter, an analog multiplexer and an address generator, the analog to digital converter having an input terminal and an output, the analog to digital converter being operable to receive an analog input signal at the input terminal and operable to generate a digital output signal at the output terminal in response to the analog input signal, the analog multiplexer having a plurality of input terminals and an output terminal connected to the input terminal of the analog to digital converter, the analog multiplexer being operable to provide a signal received at a selected one of the input terminals of the analog multiplexer to the input terminal of the analog to digital converter, the address generator being operable to generate an address signal at an output terminal;

an analog signal bus connected to respective output terminals of a first analog device set, a first analog device set having a plurality of the analog devices, each analog device of the first analog device set having an address input terminal, the analog signal bus being connected to a first one of the input terminals of the analog multiplexer and configured to conduct an analog signal from the first analog device set to the analog multiplexer, an output terminal of an analog device of a second analog device set being connected to a second one of the input terminals of the analog multiplexer, the second analog device set having at least one analog device, each analog device of the first and second analog device sets being operable to provide an analog output signal at an output terminal, each analog device of the first analog device set being operable to provide the analog output signal in response to an address signal received at the address input terminal of the analog device; and an address line separate from the analog signal bus, the address line being connected to the output terminal of the address generator and to the address input terminals of the first set of analog devices.

3. A method for processing analog signals, comprising:

generating an address signal;

receiving the address signal at a first plurality of analog devices connected to an analog signal bus;

transmitting an analog output signal by a selected one of the first plurality of analog devices in response to the address signal;

receiving the analog output signal from the selected one of the first plurality of analog devices by an analog multiplexer having an input terminal connected to the analog signal bus;

receiving analog output signals from a second plurality of analog devices at a corresponding plurality of input terminals of the analog multiplexer;

receiving a select signal at the analog multiplexer;

selecting one of the analog output signals received at the input terminals of the analog multiplexer in response to the select signal;

providing the selected analog output signal to an analog to digital converter; and converting the selected analog output signal to a digital signal by the analog to digital converter.

* * * * *